US012641010B2

(12) United States Patent
Qiu et al.

(10) Patent No.: US 12,641,010 B2
(45) Date of Patent: May 26, 2026

(54) NODE PROTECTION METHOD, DEVICE, ELECTRONIC EQUIPMENT, AND MEDIUM

(71) Applicant: New H3C Technologies Co., Ltd., Hangzhou (CN)

(72) Inventors: Yuanxiang Qiu, Beijing (CN); Changwang Lin, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 0 days.

(21) Appl. No.: 18/714,953

(22) PCT Filed: Nov. 8, 2022

(86) PCT No.: PCT/CN2022/130582
§ 371 (c)(1),
(2) Date: May 30, 2024

(87) PCT Pub. No.: WO2024/098244
PCT Pub. Date: May 16, 2024

(65) Prior Publication Data
US 2025/0260640 A1      Aug. 14, 2025

(51) Int. Cl.
*H04L 45/28* (2022.01)
*H04L 45/00* (2022.01)

(52) U.S. Cl.
CPC .............. *H04L 45/28* (2013.01); *H04L 45/22* (2013.01); *H04L 45/566* (2013.01)

(58) Field of Classification Search
CPC ........ H04L 45/28; H04L 45/22; H04L 45/566
See application file for complete search history.

(56) References Cited

U.S. PATENT DOCUMENTS

2015/0109902 A1* 4/2015 Kumar .................... H04L 45/28
                                                      370/219
2017/0037396 A1   2/2017 Lee
                              (Continued)

FOREIGN PATENT DOCUMENTS

CN          113472658 A     10/2021
CN          114531395 A      5/2022
                    (Continued)

OTHER PUBLICATIONS

Cheng et al., "SRv6 Egress Protection with Multi-home scenario", ietf.org/archive/id/draft-cheng-rtgwg-srv6-mutlihome-egress-protection-01.txt, 8 pages (2022).

*Primary Examiner* — Chris Parry
*Assistant Examiner* — Dixon F Dabipi
(74) *Attorney, Agent, or Firm* — McDonnell Boehnen Hulbert & Berghoff LLP

(57) ABSTRACT
Embodiments of the present application provide a node protection method, device, electronic equipment and medium, which are applied to a first node, comprising: obtaining a first service packet, of which a first SRH extension header contains a first SID list and a preset flag bit, the first SID list containing a primary SID of a primary tail node on a primary path for forwarding the first service packet and a backup SID of a backup tail node, the preset flag bit being set to a first value indicating that the first SRH extension header carries the backup SID; forwarding the first service packet. After a primary tail node is unreachable and before routing converges again, a user connected downstream of the CE device will not experience traffic interruption, which ensures tail node reliability and increases network reliability.

17 Claims, 6 Drawing Sheets

(56)                    References Cited

U.S. PATENT DOCUMENTS

2021/0160168  A1*    5/2021   Li   ......................... H04L 45/123
2021/0409312  A1*   12/2021   Chen ....................... H04L 45/28
2023/0216780  A1*    7/2023   Chen ....................... H04L 45/22
                                                    370/216
2024/0121178  A1*    4/2024   Liu  ......................... H04L 45/22

FOREIGN PATENT DOCUMENTS

WO        2020072079  A1      4/2020
WO        2021148021  A1      7/2021

* cited by examiner

128bits

| Locator | Function | Arguments | MBZ |
|---------|----------|-----------|-----|

Fig. 1

| Version | TrafficClass | Flow Label | |
|---------|--------------|------------|--|
| Payload Length | | Next Header | Hoplimit |
| Source Address（128bit） | | | |
| Destination Address（128bit） | | | |

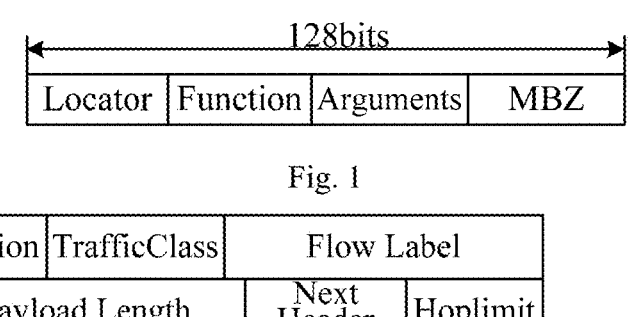

| new IPv6 basic header | SRH | original service packet |
|-----------------------|-----|-------------------------|

| 0 | 7 | 15 | 23 | 31 |
|---|---|----|----|----|

| Next Header | Hdr Ext Length | Routing Type | Segments Left |
|-------------|----------------|--------------|---------------|
| Last Entry | Flags | Tag | |
| Segment List[0]（128 bits IPv6 address） | | | |
| ...... | | | |
| Segment List[n-1]（128 bits IPv6 address） | | | |
| Optional Type Length Value objects（variable） | | | |

Fig. 2

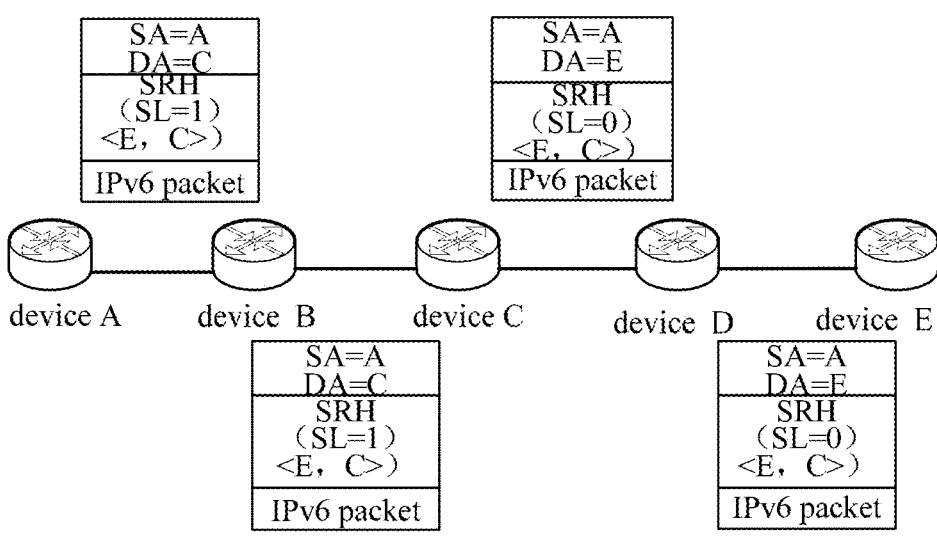

| SA=A DA=C SRH （SL=1） <E，C> IPv6 packet | SA=A DA=E SRH （SL=0） <E，C> IPv6 packet |
|---|---| device A    device B    device C    device D    device E

| SA=A DA=C SRH （SL=1） <E，C> IPv6 packet | SA=A DA=E SRH （SL=0） <E，C> IPv6 packet |
|---|---|

Fig. 3

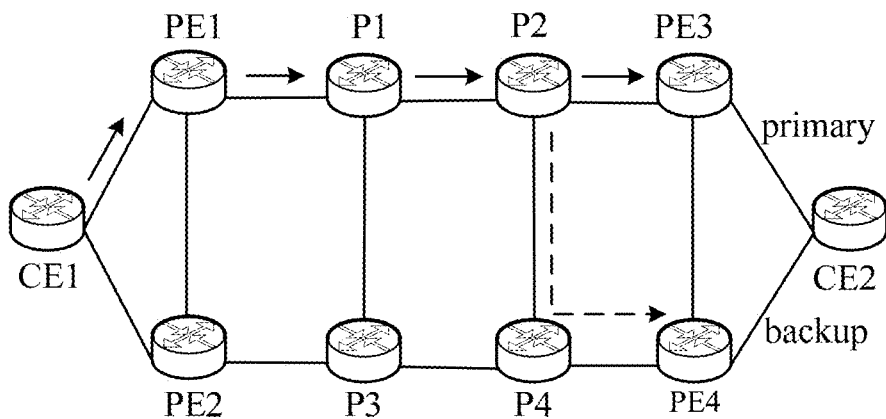

Fig. 4 obtaining a first service packet, a first SRH
extension header of which containing a first
SID list and a preset flag bit, the first SID list
containing a primary SID of a primary tail node
on a primary path for forwarding the first
service packet and a backup SID of a backup
tail node, the preset flag bit being set to a first
value indicating that the first SRH extension
header carries a backup SID

S51 forwarding the first service packet

| Next Header | Hdr Ext Len | Routing Type | SL=n | |
|---|---|---|---|---|
| Last Entry=n | Flags(B-flag=1) | Tag | | |
| backup SID(Segment List[0]，128-bit IPv6 address) | | | | |
| primary SID(Segment List[1]，128-bit IPv6 address) | | | | |
| ... | | | | |
| Segment List[n](128-bit IPv6 address) | | | | |
| Optional Type Length Value objects(variable) | | | | |

Fig. 6a

| Next Header | Hdr Ext Len | Routing Type | SL=n-1 |
|---|---|---|---|
| Last Entry=n-1 | Flags(B-flag=0) | Tag | |
| primary SID(Segment List[0], 128-bit IPv6 address) | | | |
| Segment List[1](128-bit IPv6 address) | | | |
| ... | | | |
| Segment List[n-1](128-bit IPv6 address) | | | |
| Optional Type Length Value objects(variable) | | | |

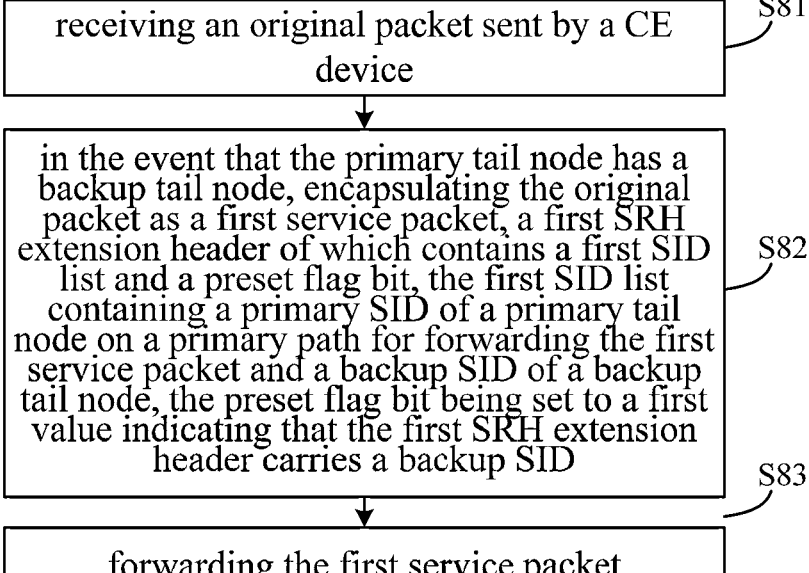

receiving an original packet sent by a CE device ⟋S81 in the event that the primary tail node has a backup tail node, encapsulating the original packet as a first service packet, a first SRH extension header of which contains a first SID list and a preset flag bit, the first SID list containing a primary SID of a primary tail node on a primary path for forwarding the first service packet and a backup SID of a backup tail node, the preset flag bit being set to a first value indicating that the first SRH extension header carries a backup SID ⟋S82 forwarding the first service packet ⟋S83

Fig. 8

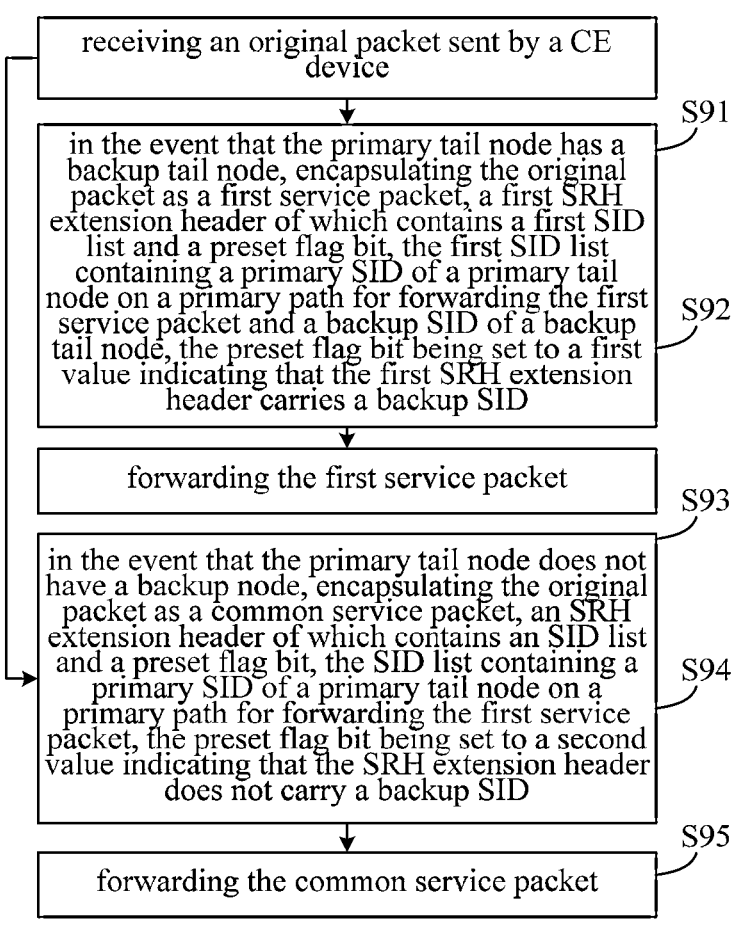

receiving an original packet sent by a CE device

S91 in the event that the primary tail node has a backup tail node, encapsulating the original packet as a first service packet, a first SRH extension header of which contains a first SID list and a preset flag bit, the first SID list containing a primary SID of a primary tail node on a primary path for forwarding the first service packet and a backup SID of a backup tail node, the preset flag bit being set to a first value indicating that the first SRH extension header carries a backup SID

S92 forwarding the first service packet

S93 in the event that the primary tail node does not have a backup node, encapsulating the original packet as a common service packet, an SRH extension header of which contains an SID list and a preset flag bit, the SID list containing a primary SID of a primary tail node on a primary path for forwarding the first service packet, the preset flag bit being set to a second value indicating that the SRH extension header does not carry a backup SID

S94 forwarding the common service packet

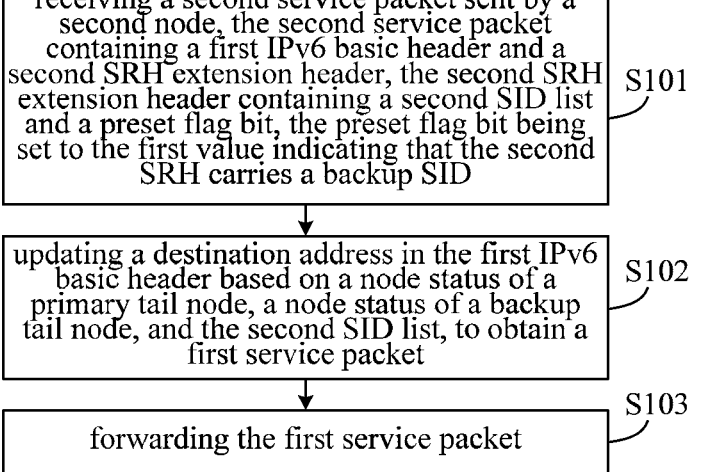

receiving a second service packet sent by a second node, the second service packet containing a first IPv6 basic header and a second SRH extension header, the second SRH extension header containing a second SID list and a preset flag bit, the preset flag bit being set to the first value indicating that the second SRH carries a backup SID

S101 updating a destination address in the first IPv6 basic header based on a node status of a primary tail node, a node status of a backup tail node, and the second SID list, to obtain a first service packet

S102 forwarding the first service packet

S103

Fig. 10 obtaining a first service packet, a first SRH extension header of which contains a first SID list and a preset flag bit, the first SID list containing a primary SID of a primary tail node on a primary path for forwarding the first service packet and a back up SID of a backup tail node, the preset flag bit being set to a first value indicating that the first SRH extension header carries a backup SID

S111 stripping off an outer encapsulation of the first service packet, to obtain an original packet

S112 forwarding the original packet

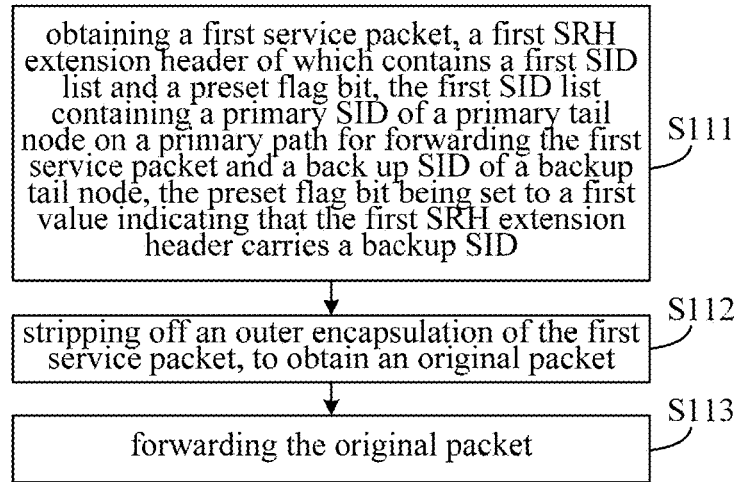

packet 2

| DA=A1:: |
|---|
| SRH(SL=3, LastEntry=3) (A4::100, A3::100, A2::1, A1::) |
| packet 1 | packet 3

| DA=A2::1 |
|---|
| SRH(SL=2, LastEntry=3) (A4::100, A3::100, A2::1, A1::) |
| packet 1 | packet 4

| DA=A3::100 |
|---|
| SRH(SL=1, LastEntry=3) (A4::100, A3::100, A2::1, A1::) |
| packet 1 |

A0::
PE1

A1::
P1

End.X SID=A2::1 VPN SID=A3::100
P2                    PE3 primary

CE1

CE2 backup

PE2        P3        P4        PE4
VPN SID=A4::100

| DA=A4::100 |
|---|
| SRH(SL=0, LastEntry=3) (A4::100, A3::100, A2::1, A1::) |
| packet 1 | packet 5

| obtaining module | forwardin g module |

NODE PROTECTION METHOD, DEVICE, ELECTRONIC EQUIPMENT, AND MEDIUM

PRIORITY

The present disclosure is a U.S. National Phase Application under 35 U.S.C. § 371 of International Application No. PCT/CN2022/130582 filed Nov. 8, 2022, and entitled "NODE PROTECTION METHOD AND APPARATUS, ELECTRONIC DEVICE, AND MEDIUM", which is incorporated herein by reference in its entirety.

TECHNICAL FIELD

The present application relates to the technical field of communications, and in particular, to a node protection method, device, electronic equipment, and medium.

BACKGROUND

Interactive multimedia service applications such as Voice over Internet Protocol (VOIP) applications are very sensitive to network packet loss, and generally can tolerate only tens of milliseconds of network packet loss. However, when a link or node in a network malfunctions, the time required for restoring service transmission is generally hundreds of milliseconds, or even reaches several seconds, which cannot meet service requirements.

SUMMARY

An objective of embodiments of the present application is to provide a node protection method, device, electronic equipment, and medium, so as to enhance reliability of an SRv6 tail node and increase network reliability. Specific technical solutions are as follows:

In a first aspect, the present application provides a node protection method applied to a first node, comprising:

obtaining a first service packet, of which a first SRH extension header contains a first SID list and a preset flag bit, the first SID list containing a primary SID of a primary tail node on a primary path for forwarding the first service packet and a backup SID of a backup tail node, the preset flag bit being set to a first value indicating that the first SRH extension header carries the backup SID;

forwarding the first service packet.

In some embodiments, in the event that the first node is a source node on the primary path, the block of obtaining a first service packet comprises:

receiving an original packet sent by a customer edge device;

in the event that the primary tail node has a backup tail node, encapsulating the original packet as the first service packet.

In some embodiments, in the event that the first node is an endpoint node or relay node on the primary path other than the primary tail node, the obtaining a first service packet comprises:

receiving a second service packet sent by a second node, the second service packet containing a first IPv6 basic header and a second SRH extension header, the second SRH extension header containing a second SID list and the preset flag bit, the preset flag bit being set to a first value indicating that the second SRH extension header carries the backup SID;

updating a destination address in the first IPv6 basic header based on a node status of the primary tail node, a node status of the backup tail node, and the second SID list, to obtain the first service packet.

In some embodiments, the updating a destination address in the first IPv6 basic header based on a node status of the primary tail node, a node status of the backup tail node, and the second SID list, to obtain the first service packet, comprises:

if the primary tail node is unreachable but the backup tail node is reachable, updating the destination address in the first IPv6 basic header to the backup SID, to obtain the first service packet;

if the primary tail node is reachable, in the event that the first node is an endpoint node, updating the destination address in the first IPv6 basic header to an SID of an endpoint node of a next hop based on the second SID list, to obtain the first service packet.

In some embodiments, the updating a destination address in the first IPv6 basic header based on a node status of the primary tail node, a node status of the backup tail node, and the second SID list, to obtain the first service packet, comprises:

if the first node is directly connected with the primary tail node, the primary tail node is unreachable, but the backup tail node is reachable, updating the destination address in the first IPv6 basic header to the backup SID, to obtain the first service packet;

if the first node is not directly connected with the primary tail node, or if the first node is directly connected with the primary tail node and the primary tail node is reachable, in the event that the first node is an endpoint node, updating the destination address of the first IPv6 basic header to an SID of an endpoint node of a next hop based on the second SID list, to obtain the first service packet.

In some embodiments, in the event that the first node is the primary tail node or the backup tail node, the forwarding the first service packet comprises:

stripping off the outer encapsulation of the first service packet, to obtaining an original packet;

forwarding the original packet.

In some embodiments, the preset flag bit is set to a first value, the SID encapsulated in the second last element contained in the first SID list is the primary SID, and the SID encapsulated in the last element is the backup SID;

the preset flag bit is set to a second value, and the SID encapsulated in the last element contained in the first SID list is the primary SID.

In some embodiments, the first value is 1 or 0.

In some embodiments, the first SRH extension header further contains Flags field in which a flag bit is the preset flag bit.

In a second aspect, the present application provides a node protection device applied to a first node, comprising:

an obtaining module to obtain a first service packet, of which a first SRH extension header contains a first SID list and a preset flag bit, the first SID list containing a primary SID of a primary tail node on a primary path for forwarding the first service packet and a backup SID of a backup tail node, the preset flag bit being set to a first value indicating that the first SRH extension header carries the backup SID;

a forwarding module to forward the first service packet.

In some embodiments, in the event that the first node is a source node on the primary path, the obtaining module is specifically to:

receive an original packet sent by a customer edge device;

in the event that the primary tail node has a backup tail node, encapsulate the original packet as the first service packet.

In some embodiments, in the event the first node is an endpoint node or relay node on the primary path other than the primary tail node, the obtaining module is specifically to:

receive a second service packet sent by a second node, the second service packet containing a first IPv6 basic header and a second SRH extension header, the second SRH extension header containing a second SID list and the preset flag bit, the preset flag bit being set to a first value indicating that the second SRH extension header carries the backup SID;

update a destination address in the first IPv6 basic header based on a node status of the primary tail node, a node status of the backup tail node, and the second SID list, to obtain the first service packet.

In some embodiments, the obtaining module is specifically to:

if the primary tail node is unreachable but the backup tail node is reachable, update the destination address in the first IPv6 basic header to the backup SID, to obtain the first service packet;

if the primary tail node is reachable, in the event that the first node is an endpoint node, update the destination address in the first IPv6 basic header to an SID of an endpoint node of a next hop based on the second SID list, to obtain the first service packet.

In some embodiments, the obtaining module is specifically to:

if the first node is directly connected with the primary tail node, the primary tail node is unreachable, but the backup tail node is reachable, update the destination address in the first IPv6 basic header to the backup SID, to obtain the first service packet;

if the first node is not directly connected with the primary tail node, or if the first node is directly connected with the primary tail node and the primary tail node is reachable, in the event that the first node is an endpoint node, update the destination address of the first IPv6 basic header to an SID of an endpoint node of a next hop based on the second SID list, to obtain the first service packet.

In some embodiments, in the event that the first node is the primary tail node or the backup tail node, the forwarding module is specifically to strip off the outer encapsulation of the first service packet, to obtain an original packet; and forward the original packet.

In some embodiments, the preset flag bit is set to a first value, the SID encapsulated in the second last element contained in the first SID list is the primary SID, and the SID encapsulated in the last element is the backup SID;

the preset flag bit is set to a second bit, and the SID encapsulated in the last element contained in the first SID list is the primary SID.

In some embodiments, the first value is 1 or 0.

In some embodiments, the first SRH extension header further contains Flags field in which a flag bit is the preset flag bit.

In a third aspect, the present application provides an electronic equipment comprising:

a processor;

a transceiver; and, a machine readable storage medium storing machine executable instructions capable of being executed by the processor; the machine executable instructions cause the processor to execute the following blocks of:

obtaining a first service packet, of which a first SRH extension header contains a first SID list and a preset flag bit, the first SID list containing a primary SID of a primary tail node on a primary path for forwarding the first service packet and a backup SID of a backup tail node, the preset flag bit being set to a first value indicating that the first SRH extension header carries the backup SID;

forwarding the first service packet.

In some embodiments, in the event that the electronic equipment is a source node on the primary path, the machine executable instructions specifically cause the processor to execute the following blocks of:

receiving an original packet sent by a customer edge device;

in the event that the primary tail node has a backup tail node, encapsulating the original packet as the first service packet.

In some embodiments, in the event that the electronic equipment is an endpoint node or relay node on the primary path other than the primary tail node, the machine executable instructions specifically cause the processor to execute the following blocks of:

receiving a second service packet sent by a second node, the second service packet containing a first IPv6 basic header and a second SRH extension header, the second SRH extension header containing a second SID list and the preset flag bit, the preset flag bit being set to a first value indicating that the second SRH extension header carries the backup SID;

updating a destination address in the first IPv6 basic header based on a node status of the primary tail node, a node status of the backup tail node, and the second SID list, to obtain the first service packet.

In some embodiments, the machine executable instructions specifically cause the processor to execute the following blocks of:

if the primary tail node is unreachable but the backup tail node is reachable, updating the destination address in the first IPv6 basic header to the backup SID, to obtain the first service packet;

if the primary tail node is reachable, in the event that the first node is an endpoint node, updating the destination address in the first IPv6 basic header to an SID of an endpoint node of a next hop based on the second SID list, to obtain the first service packet.

In some embodiments, the machine executable instructions specifically cause the processor to execute the following blocks of:

if the first node is directly connected with the primary tail node, the primary tail node is unreachable, but the backup tail node is reachable, updating the destination address in the first IPv6 basic header to the backup SID, to obtain the first service packet;

if the first node is not directly connected with the primary tail node, or if the first node is directly connected with the primary tail node and the primary tail node is reachable, in the event that the first node is an endpoint node, updating the destination address of the first IPv6 basic header to an SID of an endpoint node of a next hop based on the second SID list, to obtain the first service packet.

In some embodiments, in the event that the electronic equipment is the primary tail node or the backup tail node, the machine executable instructions specifically cause the processor to execute the following blocks of:

> stripping off the outer encapsulation of the first service packet, to obtain an original packet; and forwarding the original packet.

In some embodiments, the preset flag bit is set to a first value, the SID encapsulated in the second last element contained in the first SID list is the primary SID, and the SID encapsulated in the last element is the backup SID;

> the preset flag bit is set to a second bit, and the SID encapsulated in the last element contained in the first SID list is the primary SID.

In some embodiments, the first value is 1 or 0.

In some embodiments, the first SRH extension header further contains a Flags field in which a flag bit is the preset flag bit.

In a fourth aspect, the present application provides a machine readable storage medium storing machine executable instructions, the machine executable instructions, when called and executed by a processor, causing the processor to: implement the blocks of any described node protection method.

In the technical solutions provided by embodiments of the present application, a preset flag bit is added to an SRH extension header by means of which it is indicated that the SRH extension header carries a backup SID. In addition, the SID of a backup tail node is added to an SID list contained in the SRH extension header. Based on the preset flag bit and the SID of the backup tail node contained in the SID list, in the event that the primary tail node is unreachable but the backup tail node is reachable, the first node can send the first service packet to the backup tail node for the back tail node to send the first service packet to a destination device corresponding to the original packet. It can be seen that in the technical solutions provided by embodiments of the present application, when CE is multi-homed to a plurality of tail nodes, after a primary tail node is unreachable, before routing converges again, a user connected downstream of the CE device will not experience traffic interruption, which ensures tail node reliability and increases network reliability.

BRIEF DESCRIPTION OF THE FIGURES

In order to more clearly illustrate the technical solutions of the embodiments of the present application and the prior art, the accompanying drawings required in the embodiments and the prior art are briefly described below. Obviously, the accompanying drawings in the following description are only some of the embodiments of the present invention. Those skilled in the art can also obtain other drawings based on these drawings without creative effort.

FIG. 1 is a schematic view of an SRv6 SID format;

FIG. 2 is a schematic view of an SRv6 packet format;

FIG. 3 is an exemplary schematic view of a process of forwarding an SRv6 packet;

FIG. 4 is a schematic view of multi-homing networking;

FIG. 5 is a schematic view of a first flow chart of a node protection method provided by an embodiment of the present application;

FIG. 6a is a first schematic view of an SRH format provided by an embodiment of the present application;

FIG. 6b is a second schematic view of an SRH format provided by an embodiment of the present application;

FIG. 7 is a schematic view of a preset flag bit in Flags field provided by an embodiment of the present application;

FIG. 8 is a schematic view of a second flow chart of a node protection method provided by an embodiment of the present application;

FIG. 9 is a schematic view of a third flow chart of a node protection method provided by an embodiment of the present application;

FIG. 10 is a schematic view of a fourth flow chart of a node protection method provided by an embodiment of the present application;

FIG. 11 is a schematic view of a fifth flow chart of a node protection method provided by an embodiment of the present application;

FIG. 12 is an exemplary schematic view of a process of forwarding an SRv6 packet based on the multi-homing networking shown in FIG. 4;

DETAILED DESCRIPTION OF THE INVENTION

Figure 13:
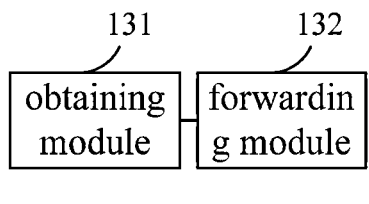
FIG. 13 is a schematic structural view of a node protection device provided by an embodiment of the present application.

In order to make the objectives, technical solutions, and advantages of the present application clearer, the present application will be further described in detail below with reference to the accompanying drawings and embodiments. Apparently, the described embodiments are only some of the embodiments of the present application, not all of them. Based on the embodiments in the present application, all other embodiments obtained by those of ordinary skill in the art without creative efforts fall within the protection scope of the present application.

To facilitate understanding, relevant concepts involved in embodiments of the present application are explained and presented.

1. Introduction of SRv6

Segment Routing (SR) uses a source node routing mechanism. A Segment Identifier (SID) of a Segment that a forwarding path will pass is encapsulated in advance in a source node. When a packet passes an SR node, the SR node forwards the packet based on the SID of the packet. Other than the source node, other nodes do not need to maintain a path status.

Segment Routing IPv6 (SRv6) means realization of SR based on an IPv6 forwarding plane. SRv6 can insert a routing extension header, i.e., a Segment Routing Header (SRH), in an IPv6 packet, and add the SIDs of all the Segments that a forwarding path will pass, i.e., an SID list, in the SRH, thus explicitly indicating the forwarding path of the IPv6 packet. SRv6 provides a flexible and highly efficient control means for a Software Defined Wide Area Network (SD-WAN). It has the characteristics of being easy to deploy and easy to expand, can better achieve traffic scheduling and path optimization, ensures the quality of key services, balances traffic distribution, increases utilization of dedicated lines, and reduces line costs.

Based on different functions, nodes in an SRv6 can be classified into the following several roles:

Source node: responsible for inserting an SRH in an IPv6 basic header of an IPv6 packet, or encapsulating an IPv6 basic header at an outer layer of the packet and inserting an SRH. A source node is configured to introduce a packet stream into an SRv6 path defined by a Segment List in the SRH.

Relay node: located on the SRv6 path of a packet. It does not participate in SRv6 processing, but only executes the forwarding of common IPv6 packets. A relay node can be a node that supports SRv6, or a node that does not support SRv6.

Endpoint node: if the IPv6 destination address of a received SRv6 packet is an SRv6 SID configured on an Endpoint node, processing is performed based on an instruction of the SRv6 SID, and the SRH is updated.

Tail node: the last Endpoint node on an SRv6 forwarding path.

The same node can play different roles in different SRv6 paths. For example, one node is a source node in an SRv6 path and can be a relay node or an Endpoint node in another SRv6 path.

In SRv6, an SID is configured to define a certain network function or represent a certain network instruction. The format of an SRv6 SID is in the form of an IPv6 address. As shown in FIG. 1, the SRv6 SID is composed of Locator field, Function field, Arguments field, and MBZ (Must be zero) field.

Locator: used to identify the network segment to which an SID belongs. Locator is unique in an SR domain.

Function: used to identify a local operation instruction bound to an SIR. After a specified node in an SR domain receives traffic, relevant operations are executed based on the Function field of an SRv6 SID.

Arguments: used to define information such as flow and service of a packet.

MBZ (Must be zero): in the event that the sum of the bits of Locator, Function, and Arguments is smaller than 128 bits, the other bits are filled with 0.

2. Format of an SRv6 Packet

The format of encapsulating an SRv6 packet is that: a new IPv6 basic header and an SRH are added to the outer layer of an original three-layer data packet. An SRH is a routing extension header with the routing type of 4. The format of an SRv6 packet is as shown in FIG. 2. An SRv6 packet contains an IPv6 basic header, an SRH, and an original packet.

The IPv6 basic header contains: Version (Ver), Traffic class, Flow Label, Payload Length, Next header, Hop limit, Source Address (SA), and Destination Address (DA). Next header takes a value of 43, representing that the next header is a routing extension header.

The SRH Contains:

Next Header, with a length of 8 bits, which is used to identify the type of the next packet header.

Hdr Ext Len, with a length of 8 bits, representing the length of an SRH header in units of 8 bytes, not including the first 8 bytes.

Routing Type, with a length of 8 bits and a value of 4, representing that an SRH is carried.

Segments Left (SL), with a length of 8 bits, representing the serial number of the next SID to be looked up, taking an initial value of n−1, n representing the number of SIDs encapsulated in the SRH, the value of SL decreasing by 1 every time an endpoint node is passed.

Last Entry, with a length of 8 bits, taking a value being the serial number of the first SID of a packet actual forwarding path in the SRH.

Flags, with a length of 8 bits, which is flag bit information.

Tag, with a length of 16 bits, which is used to flag a set of packets that have the same characteristics.

Segment List, which is an SID list, with nodes on a packet forwarding path arranged in the order from far to near, in other words, Segment List [0] representing the last SID of the forwarding path, Segment List [1] representing the second last SID of the forwarding path, so on and so forth.

Optional Type Length Value objects (variable).

3. The Process of Forwarding an SRv6 Packet

As shown in FIG. 3, device A in FIG. 3 is a source node, device C and device E are Endpoint nodes, and device B and device D are relay nodes.

Block 1, after device A, as a source node, receives an original packet, it encapsulates an SRH and an IPv6 basic header for the original packet, looks for a routing table based on the destination address in the encapsulated IPv6 basic header, and thus forwards the encapsulated packet to device B.

Because the path from device A to device D needs to pass two Endpoint nodes, device C and device E, in the Segments Left field in the SRH, SL=1, and the SID list in the SRH contains Segment List [0]=E and Segment List [1]=C.

In the IPv6 basic header, the source address is the address of device A, and the destination address is the address indicated by SL, i.e., the address of Segment List [1] indicated by SL=1, which is the address of device C.

Block 2, after device B receives the packet, it looks up a routing table based on the destination address in the IPv6 basic header, and forwards the packet to device C.

Block 3, device C checks SL in the SRH, and, if SL>0, then reduces the value of SL by 1 and updates the destination address in the IPv6 basic header to the address indicated by SL, i.e., Segment List [0] that corresponds to SL=0, which is the address of device E. Then, device C forwards the packet to device D.

Block 4, after device D receives the packet, it looks up a routing table based on the destination address in the IPv6 basic header, and forwards the packet to device E.

Block 5, device E, as a tail node, receives the packet and checks the value of SL in the SRH header. If it finds out that SL=0, device E de-encapsulates the packet, deletes the encapsulated IPv6 basic header and the SRH, obtains the original packet, and forwards the packet based on the destination address of the original packet.

In the scenario of multi-homing, CE is multi-homed to a plurality of tail nodes. A source node, after learning the multi-homing routing of CE by means of a routing protocol, determines a most optimal path and a second most optimal path based on a routing optimization strategy, the exit device on the most optimal path being a primary tail node the SID of which serves as a primary SID, the exit device on the second most optimal path being a backup tail node the SID of which serves as a backup SID. The most optimal path is a primary path and the second most optimal path is a backup path.

FIG. 4 shows multi-homing networking. In FIG. 4, Customer Edge (CE) devices include CE1 to CE2, Provider Edge (PE) devices include PE1 to PE4, and Non-Provider Edge (P) devices include P1 to P4. In FIG. 4, in the direction from CE1 to CE2, PE1 is a source node. PE1 determines a most optimal path, PE1→P1→P2→PE3, and a second most optimal path, PE1→P1→P2→P4→PE4, by means of a routing protocol and a routing optimization strategy. CE2 is multi-homed to tail nodes PE3 and PE4. PE3 is a primary tail node. The SID of PE3 is a primary SID. PE4 is a backup tail node. The SID of PE4 is a backup SID.

Interactive multimedia service applications are very sensitive to network packet loss, and generally can tolerate only tens of milliseconds of network packet loss. However, when a link or node in a network malfunctions, the time required for restoring service transmission is generally hundreds of milliseconds, or even reaches several seconds, which cannot meet service requirements. To reduce traffic loss to the maximum, an embodiment of the present application provides a node protection method, so as to enhance reliability of SRv6 multi-homing tail nodes and increase network reliability.

As shown in FIG. 5, FIG. 5 is a schematic view of a first flow chart of a node protection method provided by an embodiment of the present application applied to any node in an SRv6 network, such as any device of PE1 to PE4 and P1 to P4 in FIG. 4. To facilitate differentiation and understanding, the first node is described below as an example without being limiting. The node protection method includes:

Block S51, obtaining a first service packet, a first SRH extension header of which containing a first SID list and a preset flag bit, the first SID list containing a primary SID of a primary tail node on a primary path for forwarding the first service packet and a backup SID of a backup tail node, the preset flag bit being set to a first value indicating that the first SRH extension header carries a backup SID;

Block S52, forwarding the first service packet.

In the technical solution provided by the embodiment of the present application, a preset flag bit is added to an SRH extension header by means of which it is indicated that the SRH extension header carries a backup SID. In addition, the SID of a backup tail node is added to an SID list contained in the SRH extension header. Based on the preset flag bit and the SID of the backup tail node contained in the SID list, in the event that the primary tail node is unreachable but the backup tail node is reachable, the first node can send the first service packet to the backup tail node for the back tail node to send the first service packet to a destination device corresponding to the original packet. It can be seen that in the technical solution provided by the embodiment of the present application, when CE is multi-homed to a plurality of tail nodes, after a primary tail node is unreachable and before routing converges again, a user connected downstream of the CE device will not experience traffic interruption, which ensures tail node reliability and increases network reliability.

In the above-described block S51, the first service packet can be any SRv6 packet transmitted in a network. The first service packet contains an IPv6 basic header and an SRH extension header. The SRH extension header contains an SID list and a preset flag bit. To facilitate differentiation and understanding, the SRH extension header contained in the first service packet below is referred to as the first SRH extension header, and the SID list contained in the first SRH extension header is referred to as the first SID list. In the embodiment of the present application, the preset flag bit contained in the first SRH extension header is referred to as the first value indicating that the SRH extension header carries the backup SID, which is the SID of the backup tail node. The first value can be 1 or 0. The primary SID is the SID of the primary tail node.

The first service packet can be a service packet received by a first node, or a service packet obtained after the first node performs destination address updating or SRv6 encapsulation processing on a received service packet, which is not limited here.

After the first node obtains the first service packet, it executes block S52 of forwarding the first service packet.

In some embodiments, the preset flag bit can be used to indicate that the SRH extension header carries a backup SID, or the preset flag bit indicates that the SRH extension header does not carry a backup SID.

In the event that the preset flag bit is set to the first value, the SID encapsulated in the second last element contained in the SID list is the primary SID, and the SID encapsulated in the last element is the backup SID. In the SRH extension header as shown in FIG. 6a, Segment List[0] is the backup SID, i.e., the SID encapsulated in the last element is the SID of the backup tail node, and Segment List[1]-Segment List[n] are nodes on the primary path arranged in the order from far to near. In other words, Segment List[1] is the primary SID, i.e., the SID encapsulated in the second last element is the SID of the primary tail node. At this moment, the initial value of SL in the SRH extension header is n, and the value of Last Entry is n.

In the event that the preset flag bit is set to a second value, the SID encapsulated in the last element contained in the SID list is the primary SID. In the SRH extension header as shown in FIG. 6b, Segment List[0]-Segment List[n−1] are nodes on the primary path arranged in the order from far to near. In other words, Segment List[0] is the primary SID, i.e., the SID encapsulated in the last element is the SID of the primary tail node. At this moment, the initial value of SL in the SRH extension header is n−1, the value of Last Entry being n−1. In the event that the preset flag bit is set to a second value, the SID list does not contain the backup SID.

In the embodiment of the present application, the SID of the backup tail node is encapsulated in the last element without the need to expand the routing protocol of the control plane. To achieve rapid path switching to improve network reliability when a tail node malfunctions, one need only modify a small part of the processing of an SRv6 forwarding plane, for example, setting exit at the second last hop.

In some embodiments, to simplify node protection operations, the first node can determine whether the preset flag bit indicates that the SRH extension header carries a backup SID or that the SRH extension header does not carry a backup SID based on whether the preset flag bit is set.

For example, in the event that the preset flag bit is set, it indicates that the SRH extension header carries a backup SID. As shown in FIG. 6a, B-flag represents the preset flag bit, B-flag=1, which represents that the SRH extension header carries a backup SID. Correspondingly, in the event that the preset flag bit is not set, it indicates that the SRH extension header does not carry a backup SID. As shown in FIG. 6b, B-flag represents the preset flag bit, B-flag=0.

In the embodiment of the present application, to achieve an indication of whether the SRH extension header carries a backup SID, the preset flag bit needs to occupy only one bit, which reduces network resource consumption.

To further reduce network resource consumption, the preset flag bit can occupy a flag bit in the Flags field contained in the SRH extension header. In other words, a flag bit in the Flags field is the preset flag bit. As shown in FIG. 7, B represents the preset flag bit. The preset flag bit in FIG. 7 occupies bit[4] in the 8 bits contained in the Flags field, which is not limiting (i.e., the preset flag bit can occupy any unoccupied flag of bit[0]-bit[7] contained in the Flags field. In the embodiment of the present application, there is no need to add a preset flag bit in a service packet. Instead, a reserved bit in the Flags field is occupied, which further reduces network resource consumption.

In the embodiment of the present application, the first node can be a source node, endpoint node, or relay node on the primary path.

In the event that the first node is a source node on the primary path, as shown in FIG. 8, an embodiment of the present application further provides a node protection method, which can include:

Block S81, receiving an original packet sent by a CE device;

Block S82, in the event that the primary tail node has a backup tail node, encapsulating the original packet as a first service packet, a first SRH extension header of which contains a first SID list and a preset flag bit, the first SID list containing a primary SID of a primary tail node on a primary path for forwarding the first service packet and a backup SID of a backup tail node, the preset flag bit being set to a first value indicating that the first SRH extension header carries a backup SID;

Block S83, forwarding the first service packet.

In the technical solution provided by the embodiment of the present application, in the event that a source node detects that a primary tail node has a backup tail node, an original packet is encapsulated as a first service packet so that the SID list contained in the first service packet has a primary SID and a backup SID, and a preset flag bit is set to a first value indicating that the SRH extension header carries a backup SID, which ensures subsequent correct processing of the first service packet.

In the above-described block S81, the original packet can be any packet transmitted in a network. The original packet can be an SRv6 packet, an IPv4 packet, or an IPv6 packet, which is not limited here.

After a source node receives an original packet sent by a CE device, it can extract a packet feature of the original packet. The packet feature can include, but is not limited to, information such as five-tuple, incoming interface, and service type, which is not limited here. The source node matches the extracted packet feature with a pre-stored feature of a packet forwarded on an SR path. If the extracted packet feature is matched with the pre-stored feature of the packet forwarded on the SR path, then it can be determined that the original packet is a service packet that needs to be forwarded on the SR path. In other words, the original packet is a service packet that needs to be forwarded on the primary path.

In the event that it is determined that the original packet needs to be forwarded on the primary path, the source node executes block S82.

In the above-described block S82, the source node can judge whether the primary SID of the primary tail node has a backup SID, i.e., whether the primary tail node has a backup tail node, based on learned routing information. In the event that the primary SID has a backup SID, i.e., the primary tail node has a backup tail node, the source node encapsulates an IPv6 basic header and an SRH extension header at an outer layer of the original packet, to obtain a first service packet. Regarding the structure of the first service packet, one can refer to the relevant description of block S51, FIG. 6a, and FIG. 7.

In the above-described block S83, the first service packet further contains an IPv6 basic header. The source node can forward the first service packet based on the behavior type of the destination address in the IPv6 basic header.

For example, if the behavior type of the destination address in the IPv6 basic header is End.X type, the source node can determine the outgoing interface corresponding to the destination address in the IPv6 basic header, and sends the first service packet to the node of the next hop via the determined outgoing interface. If the behavior type of the destination address in the IPv6 basic header is End type, the source code can use the destination address in the IPv6 basic header to look up a forwarding table, and send the first service packet to the node of the next hop based on the results of the look-up of the forwarding table.

In some embodiments, as shown in FIG. 9, which is a schematic view of a third flow chart of a node protection method provided by an embodiment of the present application applied to a first node, the method can include:

Block S91, receiving an original packet sent by a CE device;

Block S92, in the event that the primary tail node has a backup tail node, encapsulating the original packet as a first service packet, a first SRH extension header of which contains a first SID list and a preset flag bit, the first SID list containing a primary SID of a primary tail node on a primary path for forwarding the first service packet and a backup SID of a backup tail node, the preset flag bit being set to a first value indicating that the first SRH extension header carries a backup SID;

Block S93, forwarding the first service packet.

The above-described blocks S91 to S93 are identical to the above-described blocks S81 to S83.

Block S94, in the event that the primary tail node does not have a backup node, encapsulating the original packet as a common service packet, an SRH extension header of which contains an SID list and a preset flag bit, the SID list containing a primary SID of a primary tail node on a primary path for forwarding the first service packet, the preset flag bit being set to a second value indicating that the SRH extension header does not carry a backup SID;

Block S95, forwarding the common service packet.

In the technical solution of the embodiment of the present application, in the event that the source node detects that the primary tail node does not have a backup tail node, the original packet is encapsulated as a common service packet so that the SID list contained in the common service packet has a primary SID but does not contain a backup SID, and a preset flag bit is set to a second value indicating that the SRH extension header does not carry a backup SID, ensuring subsequent correct processing of the common service packet. In the embodiment of the present application, by means of the preset flag bit and the detection of whether the primary tail node has a backup tail node, the source node supports at the same time packet forwarding in non-multi-homing scenarios and multi-homing scenarios, which enlarges the application scope of the technical solution provided by the embodiment of the present application.

The source node judges whether the primary SID of the primary tail node has a backup SID based on learned routing information. In other words, it judges whether the primary tail node has a backup tail node. In the event that the primary SID does not have a backup SID, i.e., the primary tail node does not have a backup tail node, the source code executes block S94 of encapsulating an IPv6 basic header and an SRH extension header in an outer layer of the original packet, to obtain a common service packet. Regarding the structure of a common service packet, one can refer to the relevant description of FIG. 6b and FIG. 7. In the embodiment of the present application, a common service packet is a service packet whose preset flag bit is set to a second value.

In the above-described block S95, the common service packet further contains an IPv6 basic header. The source code can forward the common service packet based on the behavior type of the destination address in the IPv6 basic header.

For example, if the behavior type of the destination address in the IPv6 basic header is End.X type, the source node can determine the outgoing interface corresponding to the destination address in the IPv6 basic header, and send the common service packet to the node of the next hop via the determined outgoing interface. If the behavior type of the destination address in the IPv6 basic header is End type, the source code can use the destination address in the IPv6 basic header to look up a forwarding table, and send the common service packet to the node of the next hop based on the results of the look-up of the forwarding table.

In the event that the first node is an endpoint node or relay node on a primary path other than a primary tail node, as shown in FIG. 10, an embodiment of the present application further provides a node protection method, which can include:

Block S101, receiving a second service packet sent by a second node, the second service packet containing a first IPv6 basic header and a second SRH extension header, the second SRH extension header containing a second SID list and a preset flag bit, the preset flag bit being set to a first value indicating that the second SRH carries a backup SID;

Block S102, updating a destination address in the first IPv6 basic header based on a node status of a primary tail node, a node status of a backup tail node, and the second SID list, to obtain a first service packet;

Block S103, forwarding the first service packet. This is identical to the above-described block S52.

In the technical solution of the embodiment of the present application, the first service packet can be send to a reachable primary tail node or backup tail node based on a node status of the primary tail node and the node status of the backup tail node, thus increasing network reliability.

In the above-described block S101, the second node can be a source node, or an endpoint node or relay node. The first node can be an endpoint node or relay node on an SRv6 Traffic Engineering (TE) path, or a relay node on an SRv6 Best-effort (BE) path. The second service packet is a first service packet sent by a second node. The first node receives a service packet sent by the second node, i.e., a second service packet. Regarding the structure of the second service packet, one can refer to the relevant description of the structure of the first service packet.

To facilitate differentiation and understanding, in the embodiment of the present application, the SRH extension header contained in the second service packet is referred to as the second SRH extension header, the IPv6 basic header contained in the second service packet is referred to as the first IPv6 basic header, and the SID list contained in the second SRH extension header is referred to as the second SID list.

In the above-described block S102, a node status can be reachable or unreachable. The first node can determine whether to use the primary tail node or the backup tail node as the tail node for forwarding a packet, based on the node status of the primary tail node and the node status of the backup tail node. Here, the node status of the primary tail node and the node status of the backup tail node can be recorded in a forwarding table or a routing table. The first node can obtain the node status of the primary tail node and the node status of the backup tail node from the forwarding table or the routing table.

Based on this, the first node can accurately update the destination address in the IPv6 basic header to the SID of a reachable tail node based on the node status of the primary tail node and the node status of the backup tail node, which ensures that the first service packet can be forwarded to a destination CE device and increases network reliability.

In the embodiment of the present application, any of the following modes can be adopted to execute the above-described block S012 based on the first node's role on the primary path:

If the node status of the primary tail node is unreachable but the node status of the backup tail node is reachable, i.e., the primary tail node is unreachable but the backup node is reachable, updating the destination address in the first IPv6 basic header to the backup SID, to obtain a first service packet;

If the node status of the primary tail node is reachable, i.e., the primary tail node is reachable, in the event that the first node is an endpoint node, updating the destination address of the first IPv6 basic header to the SID of the endpoint node of the next hop based on the second SID list, to obtain a first service packet;

If the node status of the primary tail node is reachable, i.e., the primary tail node is reachable, in the event that the first node is a relay node, there is no need to update the destination address of the first IPv6 basic header. The destination address of the first IPv6 basic header can be directly used to look up a forwarding table, and the second service packet can be forwarded based on the result of the look-up of the forwarding table.

In some embodiments, the first node can also detect the mode of connection between the first node and the primary tail node and thus update the destination address in the first IPv6 basic header based on the mode of connection between the first node and the primary tail node, the node status of the primary tail node, and the node status of the backup tail node and the second SID list, to obtain a first service packet. The mode of connection can be direct connection or indirect connection. The first node can determine whether the first node is the node of the second last hop on the primary path based on the mode of connection between the first node and the primary tail node. The node of the second last hop can be an endpoint node or a relay node. Here, the mode of connection between the first node and the primary tail node can be recorded in a forwarding table or a routing table. The first node can obtain the mode of connection between the first node and the primary tail node from the forwarding table or the routing table.

In the embodiment of the present application, any of the following modes can be adopted to execute the above-described block S102 based on the role of the first node on the primary path:

Mode one, if the mode of connection between the first node and the primary tail node is direct connection, and the node status of the primary tail node is unreachable but the node status of the backup tail node is reachable, i.e., the first node is directly connected with the primary tail node and the primary tail node is unreachable but the tail node is reachable, updating the destination address in the first IPv6 basic header to the backup SID, to obtain a first service packet;

In the embodiment of the present application, the first node being directly connected with the primary tail node means that the first node is the node of the second last hop on the primary path. If the destination address in the first IPv6 basic header of the second service packet is the SID of the first node, the node of the second last hop can be an endpoint node;

if the destination address in the first IPv6 basic header of the second service packet is not the SID of the first node, the node of the second last hop can also be a relay node.

For example, the structure of an SRH extension header is as shown in FIG. 6a.

In this case, in the event that the node of the second last hop is an endpoint node, in the second SRH extension header, SL=2; after the first node receives the second service packet, it reduces SL in the second SRH extension header by 1, i.e., SL=1; the first node obtains the SID encapsulated in Segment List[1] from the second SID, i.e., it obtains the SID of the primary tail node; if the SID of the primary tail node cannot be accessed, i.e., the primary tail node is unreachable, then it continues to reduce SL in the second SRH extension header by 1, i.e., SL=0, and obtains the SID encapsulated in Segment List[0] from the second SID list, i.e., obtains the SID of the backup tail node; if the SID of the backup tail node can be accessed, i.e., the backup tail node is reachable, then the destination address in the IPv6 basic header of the second service packet is updated to the SID encapsulated in Segment List[0] in the second SID list, to obtain a first service packet.

In the event that the node of the second last hop is a relay node, in the second SRH extension header, SL=1; after the first node receives the second service packet, if the destination address in the IPv6 basic header of the second service packet cannot be accessed, i.e., the primary tail node is unreachable, then it reduces SL in the second SRH extension header by 1, i.e., SL=0, and obtains the SID encapsulated in Segment List[0] from the second SID list, i.e., obtains the SID of the backup tail node; if the SID of the backup tail node can be accessed, i.e., the backup tail node is reachable, then the destination address in the IPv6 basic header of the second service packet is updated to the SID encapsulated in Segment List[0] in the second SID list, to obtain a first service packet.

Mode two, if the mode of connection between the first node and the primary tail node is direction connection, and the node status of the primary tail node is reachable, i.e., the first node is directly connected with the primary tail node and the primary tail node is reachable, in the event that the first node is an endpoint node, updating the destination address of the first IPv6 basic header to the primary SID, to obtain a first service packet; in the event that the first node is a relay node, directly forwarding the second service packet.

In the embodiment of the present application, the mode of connection between the first node and the primary tail node being direct connection means that the first node is the node of the second last hop on the primary path. The node of the second last hop can be an endpoint node or a relay node.

For example, the structure of the SRH extension header is as shown in FIG. 6a. In the event that the node of the second last hop is an endpoint node, in the second SRH extension node, SL=2; after the first node receives the second service packet, it reduces SL in the second SRH extension header by 1, i.e., SL=1; the first node obtains the SID encapsulated in Segment List[1] from the second SID, i.e., it obtains the SID of the primary tail node; if the SID of the primary tail node can be accessed, i.e., the primary tail node is reachable, then the destination address in the IPv6 basic header of the second service packet is updated to the SID encapsulated in Segment List[1] in the second SID list, to obtain a first service packet.

In the event that the node of the second last hop is a relay node, in the second SRH extension node, SL=1; after the first node receives the second service packet, if the destination address in the IPv6 basic header of the second service packet can be accessed, i.e., the primary tail node is reachable, then the destination address in the IPv6 basic header of the second service packet is used to look up a forwarding table, and the second service packet is forwarded to the node of the next hop based on the result of the look-up of the forwarding table, i.e., the second service packet is forwarded to the primary tail node.

Mode three, if the mode of connection between the first node and the primary tail node is indirect connection, i.e., the first node is not directly connected with the primary tail node, then in the event that the first node is an endpoint node, updating the destination address of the first IPv6 basic header to the SID of the node of the next hop based on the second SID list, to obtain a first service packet; in the event that the first node is a relay node, directly forwarding the second service packet.

In the embodiment of the present application, the mode of connection between the first node and the primary tail node being indirect connection means that the first node is a node that is not the node of the second last hop other than a source node and a tail node on the primary path. A node that is not the node of the second last hop can be an endpoint node or a relay node.

In the event that the mode of connection between the first node and the primary tail node is indirect connection, the first node can update the destination address of the first IPv6 basic header, to obtain a first service packet, by means of device B or device C in FIG. 3.

For example, in the event that the first node is an endpoint node, in the second SRH extension header, SL=4; after the first node receives the second service packet, it reduces SL in the second SRH extension header by 1, i.e., SL=3; the first node obtains the SID encapsulated in Segment List[3] from the second SID and updates the destination address in the IPv6 basic header of the second service packet to the SID encapsulated in Segment List[3] in the second SID list, to obtain a first service packet.

In the event that the first node is a relay node, in the second SRH extension header, SL=4; after the first node receives the second service packet, it uses the destination address in the IPv6 basic header of the second service packet to look up a forwarding table, and forwards the second service packet to the node of the next hop based on the result of the look-up of the forwarding table.

In the embodiment of the present application, the mode of connection between the first node and the primary tail node achieves the replacement of the primary tail node and the backup tail node at the node of the second last hop on the primary path. Thus, to achieve replacement of the primary tail node and the backup tail node, one only need to expand the routing protocol of a control plane and to modify a small part of the processing of a data forwarding plane, for example, reducing SL by 1 based on an existing SRv6 forwarding mode at the node of the second last hop on the primary path, which achieves rapid path switching and increases network reliability.

In the above-described block S103, in the event that the first node is an endpoint node, the first node forwards the first service node based on the behavior type of the destination address in the IPv6 basic header. In the event that the first node is a relay node, the first node uses the destination address in the IPv6 basic header to look up a forwarding table and forwards the first service packet to the node of the next hop based on the result of the look-up of the forwarding table.

In some embodiments, the first node can receive a common service packet sent by a second node, the common service packet containing an IPv6 basic header and an SRH extension header, the SRH extension header containing a preset flag bit, the preset flag bit being set to a second value indicating that the SRH extension header does not carry a backup SID; update the destination address in the IPv6 basic header of the common service packet based on an SID list contained in the common service packet and forward the common service packet with the updated destination address.

The common service packet is a service packet sent by the second node. The first node receives the common service packet sent by the second node. Regarding the structure of the common service packet, one can refer to the relevant description above.

After receiving the common service packet, the first node updates the destination address in the IPv6 basic header of the common service packet based on its own role in combination with the SID list contained in the common service packet, and forwards the common service packet obtained after the update.

For example, in the event that the first node is an endpoint node, in the SRH extension header of the common service packet, SL=4; after the first node receives the common service packet, it reduces SL in the SRH extension header of the common service packet by 1, i.e., SL=3; the first node obtains the SID encapsulated in Segment List[3] in the SID list contained in the common service packet, and updates the destination address in the IPv6 basic header of the common service packet to the SID encapsulated in Segment List[3] in a fourth SID list.

In the event that the first node is a relay node, in the SRH extension header of the common service packet, SL=4; after the first node receives the common service packet, it uses the destination address in the IPv6 basic header of the common service packet to look up a forwarding table, and forwards the common service packet to the node of the next hop based on the result of the look-up of the forwarding table.

In the event that the first node is the primary tail node or the backup tail node, as shown in FIG. 11, an embodiment of the present application further provides a node protection method, which can include:

Block S111, obtaining a first service packet, a first SRH extension header of which contains a first SID list and a preset flag bit, the first SID list containing a primary SID of a primary tail node on a primary path for forwarding the first service packet and a backup SID of a backup tail node, the preset flag bit being set to a first value indicating that the first SRH extension header carries a backup SID. This is identical to the above-described block S51.

Block S112, stripping off the outer encapsulation of the first service packet, to obtain an original packet;

Block S113, forwarding the original packet.

In the technical solution provided by the embodiment of the present application, de-encapsulating processing of the first service packet by the primary tail node or the backup tail node is supported. The IPv6 basic header and the SRH extension header encapsulated at an outer encapsulation of the first service packet is stripped off, so that in the event that the primary tail node is reachable, the primary tail node is responsible for forwarding the original packet to a destination CE device; in the event that the primary tail node is unreachable, the backup tail node is responsible for forwarding the original packet to the destination CE device, which ensures tail node reliability and increases network reliability, while at the same time increasing the node protection method's flexibility.

In the event that the first node determines itself as the primary tail node or the backup tail node, the first node performs de-encapsulating processing on the first service packet, to obtain the original packet, and then looks up a forwarding table based on the destination address of the original packet and forwards the original packet to a destination CE device based on the result of the look-up of the forwarding table.

In an embodiment, the structure of the SRH extension header is as shown in FIG. 6a. In this case, if in the first SRH extension header, SL=1, and the destination address in the IPv6 basic header of the first service packet is the SID of the first node, then the first node can determine itself as the primary tail node and then perform de-encapsulating processing on the first service packet, obtain the original packet, and forward the original packet.

If in the first SRH extension header, SL=0, and the destination address in the IPv6 basic header of the first service packet is the SID of the first node, then the first node can determine itself as the backup tail node and then perform de-encapsulating processing on the first service packet, obtain the original packet, and forward the original packet.

In connection with the multi-homing networking shown in FIG. 12, the node protection method provided by an embodiment of the present application is described below in detail. FIG. 12 contains CE1 to CE2, PE1 to PE4, and P1 to P4. B-flag represents a preset flag bit, B-flag=1, which indicates that the SRH extension header carries a backup SID.

The Locator prefix of PE1 is A0::/64, the Locator prefix of P1 is A1::/64, P2 has a Locator prefix of A2::/64 and SID A2::1 of END.X type, and PE3 has a Locator prefix of A3::/64 and VPN SID A3::100. PE4 has a Locator prefix of A4::/64 and VPN SID A4::100.

In the event that PE3 is normal, traffic from CE1 to CE2 is forwarded along a primary path of PE1→P1→P2→PE3. After configuration is completed, PE1 determines a backup path of PE1→P1→P2→P4→PE4 by means of a routing optimization strategy, the backup SID of PE3 being VPN SID A4::100 of PE4.

Under the above-described configuration, the process of forwarding a packet is as follows:

1) when PE 1 receives a packet 1 sent by CE1 towards CE2, it determines that forwarding via the path specified in the IPv6 bearer network between PE1 and PE3 is needed. PE1 encapsulates an IPv6 basic header and an SRH extension header in an outer layer of packet 1, obtaining packet 2. As shown in FIG. 12, in the SRH extension header of packet 2, SL=3, Last Entry=3, B-flag=1, and the SID list is {Segment List[0]=A4::100, Segment List[1]=A3::100, Segment List[2]=A2::1, Segment List[3]=A1::}. The destination address in the IPv6 basic header is the SID encapsulated in Segment List[SL], i.e., the destination address in the IPv6 basic header is A1::encapsulated in Segment List[3].

2) PE1 forwards packet 2 to P1 based on destination address A1 in the IPv6 basic header.

3) P1 reduces SL in the SRH extension header of packet 2 by 1, obtaining SL=2, and modifies the destination address in the IPv6 basic header of packet 2 to the SID encapsulated in Segment List[SL], i.e., the destination address in the IPv6 basic header being A2::1 encapsulated in Segment List[2], obtaining packet 3.

4) P1 forwards packet 3 to P2 based on destination address A2::1 in the IPv6 basic header.

5) P2 discovers that in the SRH extension header of packet 3, B-flag=1, and reduces SL in the SRH extension header of packet 3 by 1, obtaining SL=1; if the node indicated by the SID encapsulated in Segment List[1] is reachable, i.e., the primary tail node PE3 is reachable, then it modifies the destination address in the IPv6 basic header of packet 3 to the SID encapsulated in Segment List[SL], i.e., the destination address in the IPv6 basic header being A3::100 encapsulated in Segment List[1], obtaining packet 4, and then executes block 6);

if the node indicated by the SID encapsulated in Segment List[1] is unreachable, i.e., the primary tail node PE3 is unreachable, it reduces SL in the SRH extension header of packet 3 by 1, obtaining SL=0; if the node indicated by the SID encapsulated in Segment List[1] is reachable, i.e., the backup tail node PE4 is reachable, then it modifies the destination address in the IPv6 basic header of packet 3 to the SID encapsulated in Segment List[SL], i.e., the destination address in the IPv6 basic header being A4:100 encapsulated in Segment List[0], obtaining packet 5, and then executes block 8);

6) P2 forwards packet 4 to PE3 based on destination address A3::100 in the IPv6 basic header.

7) PE3 discovers that in the SRH extension header of packet 4, B-flag=1, and the current node is the destination address in the IPv6 basic header and is A3::100 encapsulated in Segment List[1], and then strips off the outer encapsulation of packet 4, obtaining packet 1, and forwards packet 1 towards CE2.

8) P2 forwards packet 5 to PE4 based on destination address A4:100 in the IPv6 basic header.

9) PE4 discovers that the current node is the destination address in the IPv6 basic header and is A3::100 encapsulated in Segment List[0], and then strips off the outer encapsulation of packet 5, obtaining packet 1, and forwards packet 1 towards CE2.

Corresponding to the above node protection method, an embodiment of the present application also provides a node protection device, as shown in FIG. 13, the above node protection device is applied to a first node, comprising:

an obtaining module 31 to obtain a first service packet, of which a first SRH extension header contains a first SID list and a preset flag bit, the first SID list containing a primary SID of a primary tail node on a primary path for forwarding the first service packet and a backup SID of a backup tail node, the preset flag bit being set to a first value indicating that the first SRH extension header carries the backup SID;

a forwarding module 132 to forward the first service packet.

In some embodiments, in the event that the first node is a source node on the primary path, the obtaining module 131 is specifically to:

receive an original packet sent by a customer edge device;

in the event that the primary tail node has a backup tail node, encapsulate the original packet as the first service packet.

In some embodiments, in the event the first node is an endpoint node or relay node on a primary path other than the primary tail node, the obtaining module 131 is specifically to:

receive a second service packet sent by a second node, the second service packet containing a first IPv6 basic header and a second SRH extension header, the second SRH extension header containing a second SID list and the preset flag bit, the preset flag bit being set to a first value indicating that the second SRH extension header carries the backup SID;

update a destination address in the first IPv6 basic header based on a node status of the primary tail node, a node status of the backup tail node, and the second SID list, to obtain the first service packet.

In some embodiments, the obtaining module 131 is specifically to:

if the primary tail node is unreachable but the backup tail node is reachable, update the destination address in the first IPv6 basic header to the backup SID, to obtain the first service packet;

if the primary tail node is reachable, in the event that the first node is an endpoint node, update the destination address in the first IPv6 basic header to an SID of an endpoint node of a next hop based on the second SID list, to obtain the first service packet.

In some embodiments, the obtaining module 131 is specifically to:

if the first node is directly connected with the primary tail node, the primary tail node is unreachable, but the backup tail node is reachable, update the destination address in the first IPv6 basic header to the backup SID, to obtain the first service packet;

if the first node is not directly connected with the primary tail node, or if the first node is directly connected with the primary tail node and the primary tail node is reachable, in the event that the first node is an endpoint node, update the destination address of the first IPv6 basic header to an SID of an endpoint node of a next hop based on the second SID list, to obtain the first service packet.

In some embodiments, in the event that the first node is the primary tail node or the backup tail node, the forwarding module 132 is specifically to strip off the outer encapsulation of the first service packet, to obtain an original packet; forward the original packet.

In some embodiments, the preset flag bit is set to a first value, the SID encapsulated in the second last element contained in the first SID list is the primary SID, and the SID encapsulated in the last element is the backup SID;

the preset flag bit is set to a second bit, and the SID encapsulated in the last element contained in the first SID list is the primary SID.

In some embodiments, the first value is 1 or 0.

In some embodiments, the first SRH extension header further contains Flags field in which a flag bit is the preset flag bit.

In the technical solutions provided by embodiments of the present application, a preset flag bit is added to an SRH extension header by means of which it is indicated that the SRH extension header carries a backup SID. In addition, the SID of a backup tail node is added to an SID list contained in the SRH extension header. Based on the preset flag bit and the SID of the backup tail node contained in the SID list, in the event that the primary tail node is unreachable but the backup tail node is reachable, the first node can send the first service packet to the backup tail node for the back tail node to send the first service packet to a destination device corresponding to the original packet. It can be seen that in the technical solutions provided by embodiments of the present application, when CE is multi-homed to a plurality of tail nodes, after a primary tail node is unreachable, before routing converges again, a user connected downstream of the CE device will not experience traffic interruption, which ensure tail node reliability and increase network reliability.

Figure 14:
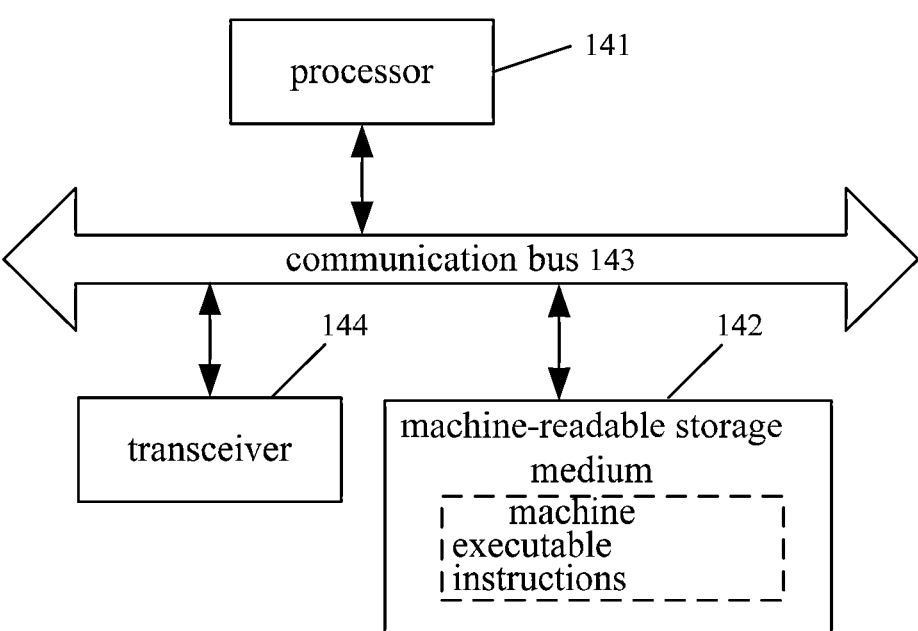
FIG. 14 is a schematic structural view of an electronic equipment provided by an embodiment of the present application.

Corresponding to the above node protection method, an embodiment of the present application also provides an electronic equipment, which can be the first node, as shown in FIG. 14, the electronic equipment includes:

a processor 141, a machine readable storage medium 142 and a transceiver 144. The machine readable storage medium 142 stores machine executable instructions capable of being executed by the processor 141; the machine executable instructions cause the processor 141 to execute the following blocks of:

obtaining a first service packet, of which a first SRH extension header contains a first SID list and a preset flag bit, the first SID list containing a primary SID of a primary tail node on a primary path for forwarding the first service packet and a backup SID of a backup tail node, the preset flag bit being set to a first value indicating that the first SRH extension header carries the backup SID;

forwarding the first service packet.

In some embodiments, in the event that the electronic equipment is a source node on the primary path, the machine executable instructions specifically cause the processor 141 to execute the following blocks of:

receiving an original packet sent by a customer edge device;

in the event that the primary tail node has a backup tail node, encapsulating the original packet as the first service packet.

In some embodiments, in the event that the electronic equipment is an endpoint node or relay node on a primary path other than the primary tail node, the machine executable instructions specifically cause the processor 141 to execute the following blocks of:

receiving a second service packet sent by a second node, the second service packet containing a first IPv6 basic header and a second SRH extension header, the second SRH extension header containing a second SID list and the preset flag bit, the preset flag bit being set to a first value indicating that the second SRH extension header carries the backup SID;

updating a destination address in the first IPv6 basic header based on a node status of the primary tail node, a node status of the backup tail node, and the second SID list, to obtain the first service packet.

In some embodiments, the machine executable instructions specifically cause the processor to execute the following blocks of:

if the primary tail node is unreachable but the backup tail node is reachable, updating the destination address in the first IPv6 basic header to the backup SID, to obtain the first service packet;

if the primary tail node is reachable, in the event that the electronic equipment is an endpoint node, updating the destination address in the first IPv6 basic header to an SID of an endpoint node of a next hop based on the second SID list, to obtain the first service packet.

In some embodiments, the machine executable instructions specifically cause the processor to execute the following blocks of:

if the electronic equipment is directly connected with the primary tail node, the primary tail node is unreachable, but the backup tail node is reachable, updating the destination address in the first IPv6 basic header to the backup SID, to obtain the first service packet;

if the electronic equipment is not directly connected with the primary tail node, or if the first node is directly connected with the primary tail node and the primary tail node is reachable, in the event that the first node is an endpoint node, updating the destination address of the first IPv6 basic header to an SID of an endpoint node of a next hop based on the second SID list, to obtain the first service packet.

In some embodiments, in the event that the electronic equipment is the primary tail node or the backup tail node, the machine executable instructions specifically cause the processor to execute the following blocks of:

stripping off the outer encapsulation of the first service packet, to obtain an original packet; forwarding the original packet.

In some embodiments, the preset flag bit is set to a first value, the SID encapsulated in the second last element contained in the first SID list is the primary SID, and the SID encapsulated in the last element is the backup SID;

the preset flag bit is set to a second bit, and the SID encapsulated in the last element contained in the first SID list is the primary SID.

In some embodiments, the first value is 1 or 0.

In some embodiments, the first SRH extension header further contains Flags field in which a flag bit is the preset flag bit.

In the technical solutions provided by embodiments of the present application, a preset flag bit is added to an SRH extension header by means of which it is indicated that the SRH extension header carries a backup SID. In addition, the SID of a backup tail node is added to an SID list contained in the SRH extension header. Based on the preset flag bit and the SID of the backup tail node contained in the SID list, in the event that the primary tail node is unreachable but the backup tail node is reachable, the first node can send the first service packet to the backup tail node for the back tail node to send the first service packet to a destination device corresponding to the original packet. It can be seen that in the technical solutions provided by embodiments of the present application, when CE is multi-homed to a plurality of tail nodes, after a primary tail node is unreachable and before routing converges again, a user connected downstream of the CE device will not experience traffic interruption, which ensures tail node reliability and increases network reliability.

As shown in FIG. 14, the electronic equipment may also comprise a communication bus 143. The processor 141, the machine-readable storage medium 142, and the transceiver 144 communicate with each other through the communication bus 143. The communication bus 143 can be a peripheral component interconnect standard (PCI) bus or an extended industry standard structure (EISA) bus, etc. The communication bus 1003 can be divided into address bus, data bus, control bus and so on.

The transceiver 144 may be a wireless communication module, and the transceiver 144 performs data interaction with other equipment under the control of the processor 141.

The machine-readable storage medium 142 may include a random access memory (RAM), and may also include a non-volatile memory (NVM), such as at least one magnetic disk memory. In addition, the machine-readable storage medium 142 may also be at least one storage device located away from the aforementioned processor.

The processor 141 can be a general-purpose processor, including a central processing unit (CPU), a network processor (NP), and the like; it can also be a digital signal processor (DSP), an application-specific integrated circuit (ASIC), Field-Programmable Gate Array (FPGA) or other programmable logic devices, discrete gate or transistor logic devices, discrete hardware components.

In yet another embodiment provided by the present application, a machine-readable storage medium is also provided, and the machine-readable storage medium stores machine executable instructions that can be executed by a processor. When called and executed by a processor, the machine executable instructions cause the processor to execute the methods of any of the node protection methods described above.

In yet another embodiment provided by the present application, a computer program product including instructions is also provided, and when it is run on a computer, it causes the computer to execute the methods of any node protection method in the above embodiments.

It should be noted that in this specification, relational terms such as first and second are only used to distinguish one entity or operation from another entity or operation, and do not necessarily require or imply that there is any such actual relationship or sequence between these entities or operations. Furthermore, the terms "comprise", "include" or any other variation thereof are intended to cover a non-exclusive inclusion such that a process, method, article, or equipment comprising a set of elements includes not only those elements, but also includes other elements not expressly listed or also include elements inherent in such a process, method, article, or equipment. Without further limitations, an element defined by the phrase "comprising a . . . " does not exclude the presence of additional identical elements in the process, method, article or equipment comprising said element.

Each embodiment in this specification is described in a related manner, the same and similar parts of each embodiment can be referred to each other, and each embodiment focuses on the differences from other embodiments. In particular, for the embodiments of the node protection device, electronic equipment, machine-readable storage medium and computer program product, since it is basically similar to the embodiment of the node protection method, the description is relatively simple. For relevant information, reference can be made to the part of the description of the embodiment of the node protection method.

The above descriptions are only preferred embodiments of the present application, and are not intended to limit the application. Any modifications, equivalent replacements, improvements, and the like made within the spirit and principles of the present application shall be included in the protection scope of the present application.

What is claimed is:

1. A node protection method, wherein the method is applied to a first node and comprises:

obtaining a first service packet, of which a first SRH extension header contains a first SID list and a preset flag bit, the first SID list containing a primary SID of a primary tail node on a primary path for forwarding the first service packet and a backup SID of a backup tail node, the preset flag bit being set to a first value indicating that the first SRH extension header carries the backup SID;

forwarding the first service packet;

wherein, in the event that the first node is an endpoint node or relay node on the primary path other than the primary tail node, the obtaining the first service packet comprises:

receiving a second service packet sent by a second node, the second service packet containing a first IPv6 basic header and a second SRH extension header, the second SRH extension header containing a second SID list and the preset flag bit, the preset flag bit being set to the first value indicating that the second SRH extension header carries the backup SID;

updating a destination address in the first IPv6 basic header based on a node status of the primary tail node, a node status of the backup tail node, and the second SID list, to obtain the first service packet.

2. The method according to claim 1, wherein, in the event that the first node is a source node on the primary path, the obtaining a first service packet comprises:

receiving an original packet sent by a customer edge device;

in the event that the primary tail node has the backup tail node, encapsulating the original packet as the first service packet.

3. The method according to claim 1, wherein, the updating a destination address in the first IPv6 basic header based on a node status of the primary tail node, a node status of the backup tail node, and the second SID list, to obtain the first service packet, comprises:

if the primary tail node is unreachable but the backup tail node is reachable, updating the destination address in the first IPv6 basic header to the backup SID, to obtain the first service packet;

if the primary tail node is reachable, in the event that the first node is the endpoint node, updating the destination address in the first IPv6 basic header to an SID of an endpoint node of a next hop based on the second SID list, to obtain the first service packet.

4. The method according to claim 1, wherein, the updating a destination address in the first IPv6 basic header based on a node status of the primary tail node, a node status of the backup tail node, and the second SID list, to obtain the first service packet, comprises:

if the first node is directly connected with the primary tail node, the primary tail node is unreachable, but the backup tail node is reachable, updating the destination address in the first IPv6 basic header to the backup SID, to obtain the first service packet;

if the first node is not directly connected with the primary tail node, or if the first node is directly connected with the primary tail node and the primary tail node is reachable, in the event that the first node is the endpoint node, updating the destination address of the first IPv6 basic header to an SID of an endpoint node of a next hop based on the second SID list, to obtain the first service packet.

5. The method according to claim 1, wherein, in the event that the first node is the primary tail node or the backup tail node, the forwarding the first service packet comprises:

stripping off an outer encapsulation of the first service packet, to obtain an original packet;

forwarding the original packet.

6. The method according to claim 1, wherein, the preset flag bit is set to the first value, an SID encapsulated in a second last element contained in the first SID list is the primary SID, and an SID encapsulated in a last element is the backup SID;

the preset flag bit is set to a second bit, and an SID encapsulated in a last element contained in the first SID list is the primary SID.

7. The method according to claim 1, wherein, the first value is 1 or 0.

8. The method according to claim 1, wherein, the first SRH extension header further contains Flags field in which a flag bit is the preset flag bit.

9. An electronic equipment, wherein the electronic equipment comprises:

a processor; a transceiver; and, a machine readable storage medium storing machine executable instructions capable of being executed by the processor; the machine executable instructions cause the processor to execute:

obtaining a first service packet, of which a first SRH extension header contains a first SID list and a preset flag bit, the first SID list containing a primary SID of a primary tail node on a primary path for forwarding the first service packet and a backup SID of a backup tail node, the preset flag bit being set to a first value indicating that the first SRH extension header carries the backup SID;

forwarding the first service packet;

wherein, in the event that the electronic equipment is an endpoint node or relay node on the primary path other than the primary tail node, the machine executable instructions specifically cause the processor to execute:

receiving a second service packet sent by a second node, the second service packet containing a first IPv6 basic header and a second SRH extension header, the second SRH extension header containing a second SID list and the preset flag bit, the preset flag bit being set to the first value indicating that the second SRH extension header carries the backup SID;

updating a destination address in the first IPv6 basic header based on a node status of the primary tail node, a node status of the backup tail node, and the second SID list, to obtain the first service packet.

10. The electronic equipment according to claim 9, wherein, in the event that the electronic equipment is a source node on the primary path, the machine executable instructions specifically cause the processor to execute:

receiving an original packet sent by a customer edge device;

in the event that the primary tail node has the backup tail node, encapsulating the original packet as the first service packet.

11. The electronic equipment according to claim 9, wherein, the machine executable instructions specifically cause the processor to execute:

if the primary tail node is unreachable but the backup tail node is reachable, updating the destination address in the first IPv6 basic header to the backup SID, to obtain the first service packet;

if the primary tail node is reachable, in the event that the electronic equipment is the endpoint node, updating the destination address in the first IPv6 basic header to an SID of an endpoint node of a next hop based on the second SID list, to obtain the first service packet.

12. The electronic equipment according to claim 11, wherein, the machine executable instructions specifically cause the processor to execute:

if the electronic equipment is directly connected with the primary tail node, the primary tail node is unreachable, but the backup tail node is reachable, updating the destination address in the first IPv6 basic header to the backup SID, to obtain the first service packet;

if the electronic equipment is not directly connected with the primary tail node, or if the electronic equipment is directly connected with the primary tail node and the primary tail node is reachable, in the event that the electronic equipment is the endpoint node, updating the destination address of the first IPv6 basic header to an SID of an endpoint node of a next hop based on the second SID list, to obtain the first service packet.

13. The electronic equipment according to claim 9, wherein, in the event that the electronic equipment is the primary tail node or the backup tail node, the machine executable instructions specifically cause the processor to execute:

stripping off an outer encapsulation of the first service packet, to obtain an original packet; forwarding the original packet.

14. The electronic equipment according to claim 9, wherein, the preset flag bit is set to the first value, an SID encapsulated in a second last element contained in the first SID list is the primary SID, and an SID encapsulated in a last element is the backup SID;

the preset flag bit is set to a second bit, and an SID encapsulated in a last element contained in the first SID list is the primary SID.

15. The electronic equipment according to claim 9, wherein, the first value is 1 or 0.

16. The electronic equipment according to claim 9, wherein, the first SRH extension header further contains Flags field in which a flag bit is the preset flag bit.

17. A non-transitory machine readable storage medium, wherein it stores machine executable instructions, the machine executable instructions, when called and executed by a processor, causing the processor to implement the methods of the method according to claim 1.

* * * * *